(12) United States Patent
Olson

(10) Patent No.: US 6,231,085 B1
(45) Date of Patent: May 15, 2001

(54) TUBING COUPLING AND HOSE END COMBINATION, AND RELATED METHOD

(75) Inventor: Donald O. Olson, El Cajon, CA (US)

(73) Assignee: Irrigation Development Company, Santee, CA (US)

( * ) Notice: Subject to any disclaimer, the term of this patent is extended or adjusted under 35 U.S.C. 154(b) by 0 days.

(21) Appl. No.: 09/079,485

(22) Filed: May 14, 1998

Related U.S. Application Data

(63) Continuation-in-part of application No. 08/843,806, filed on Apr. 21, 1997.

(51) Int. Cl.[7] .................................................. F16L 55/00
(52) U.S. Cl. .......................... 285/23; 285/93; 285/148.19; 285/179; 285/24 L; 285/331; 285/905; 285/255; 29/451
(58) Field of Search .............................. 285/93, 242, 255, 285/23, 148.19, 179, 331, 906

(56) References Cited

U.S. PATENT DOCUMENTS

| | | | |
|---|---|---|---|
| 178,649 | | 6/1876 | Loftus .................................... 285/245 |
| 3,262,721 | * | 7/1966 | Knight .............................. 285/242 X |
| 3,885,819 | | 5/1975 | Egerer et al. .......................... 285/255 |
| 4,021,061 | * | 5/1977 | Zimmerman .......................... 285/255 |
| 4,278,279 | | 7/1981 | Zimmerman .......................... 285/255 |

(List continued on next page.)

FOREIGN PATENT DOCUMENTS

| | | | |
|---|---|---|---|
| 141400 | | 12/1949 | (AU) ..................................... 285/245 |
| 235747 | * | 10/1959 | (AU) ..................................... 285/242 |
| 600086 | * | 3/1948 | (GB) ..................................... 285/242 |
| 858607 | | 1/1961 | (GB) ..................................... 285/255 |
| 1525854 | | 1/1970 | (GB) ..................................... 285/255 |
| 2004969 | | 4/1979 | (GB) ..................................... 285/245 |
| 2217416 | * | 10/1989 | (GB) ..................................... 285/242 |
| 663497 | * | 5/1964 | (IT) ...................................... 285/242 |

*Primary Examiner*—Dave W. Arola
(74) *Attorney, Agent, or Firm*—J. Mark Holland; Tom H. Dao

(57) ABSTRACT

An improved tubing adapter or coupling apparatus, and combination of same with other fittings, is characterized by an adapter member having a first end including at least one exterior barb for engagement with tubing and a sleeve member operatively positioned around the adapter. In some systems, the tubing or hose may include a fitting at its other extremity, such as a hose end, an ell, or another coupling. The sleeve member of the coupling apparatus preferably includes one or more view ports. The ports can enable the user to visually confirm the tubing has been properly and completely assembled onto the adapter member, and, following initial assembly, to visually ascertain the position of the tubing on the adapter. The apparatus also preferably includes corresponding engagement detents on the adapter and sleeve member, for initial engagement of the retaining member with the adapter member prior to assembly with tubing. The sleeve or retaining member also preferably includes an interior barb to help prevent inadvertent dislodgment of the tubing from the adapter/coupling, such as by providing clamping or "biting" action by the coupling when assembled on the tubing. In addition to various fittings at the opposite extremity of the tubing or hose, the adapter itself can include one or more other ends in internal fluid communication with the first end, which other ends may be any of a wide variety of configurations, including being similar or identical to the first end, a valve or other outlet, a plug, an elbow or tee, a container, a manifold, or another type of connection or fitting. A method of use of the adapter/coupling is disclosed, including various combinations of the steps of assembling the retaining member with the adapter member prior to assembly with selected tubing; engaging the adapter member and retaining member on the tubing; utilizing the view ports to confirm that the tubing is properly assembled on the adapter member; and connecting other fittings to the opposite extremity of the hose or tubing.

31 Claims, 2 Drawing Sheets

U.S. PATENT DOCUMENTS

| | | | |
|---|---|---|---|
| 4,577,894 | 3/1986 | Wake | 285/255 |
| 4,749,217 | 6/1988 | Causby et al. | 285/245 |
| 4,750,764 * | 6/1988 | Gibellina | 285/255 |
| 4,903,995 | 2/1990 | Blenkush et al. | 285/255 |
| 4,963,133 * | 10/1990 | Whipple | 285/242 X |
| 5,261,706 | 11/1993 | Bartholomew | 285/255 |
| 5,265,652 * | 11/1993 | Brunella | 285/93 X |
| 5,284,368 | 2/1994 | Oetiker et al. | 285/255 |
| 5,542,712 * | 8/1996 | Klinger et al. | 285/93 |
| 5,772,262 * | 6/1998 | Dupont et al. | 285/242 X |

* cited by examiner

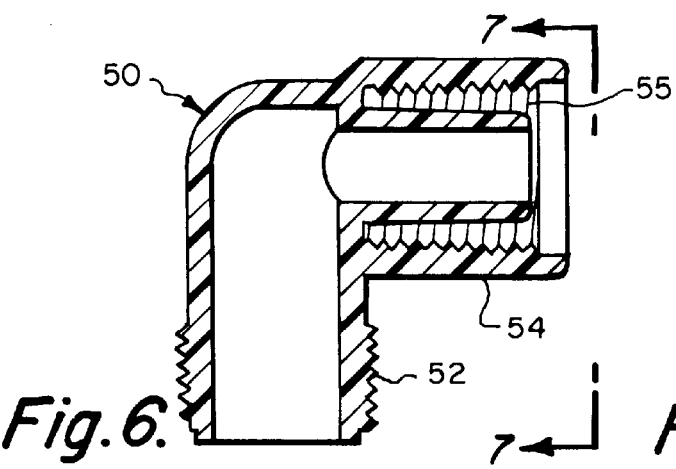
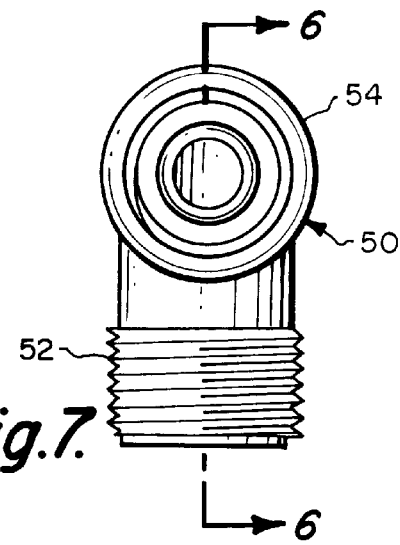
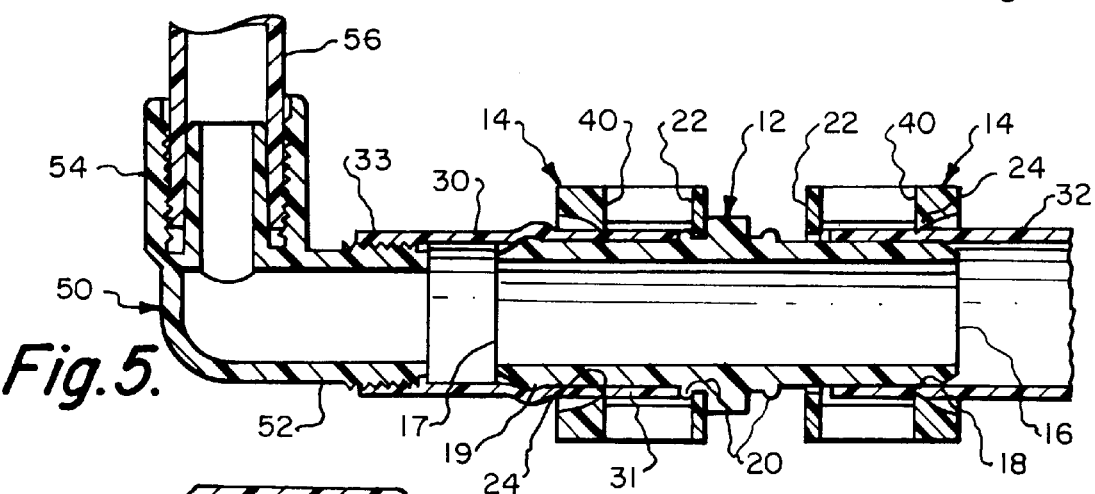

TUBING COUPLING AND HOSE END COMBINATION, AND RELATED METHOD

This is a continuation-in-part of pending application Ser. No. 08/843,806, filed Apr. 21, 1997.

BACKGROUND OF THE INVENTION

This invention relates to tubing coupling systems, and specifically to an improved tubing coupling or adapter apparatus and method that combines improved ease of assembly with the ability to visually confirm the assembly of the tubing with the coupling or adapter. The present invention lends itself to various applications, including liquid and gas tubing systems which are used in a wide range of industrial and agricultural installations, including irrigation systems. The invention is useful with tubing in numerous lengths, diameters, wall thicknesses, strengths, and configurations (including without limitation, tubing having cross-sections that are round, square, rectangular, or oval). Such tubing can include, at its opposite extremity, any of a variety of fittings, including a second one of the claimed improved tubing coupling, a hose end, an elbow (or "ell"), or any of a wide range of devices that will make themselves readily apparent to persons of ordinary skill in the art.

Elastic tubing (such as polyethylene tubing) is sometimes attached by the use of barbed fittings on adapters and couplings, such as depicted in FIG. 1. To make the desired connection, a user typically has a supply of adapters/couplings 2 and separate retaining rings 4. Prior art rings 4 and couplings 2 are not configured so that the ring is retained on the coupling prior to attachment to tubing. As a result, even if a manufacturer attempts to assist the end user by placing the rings 4 on the couplings 2, the rings typically fall off the couplings 2 during transit or handling, and the user receives a loose pile of rings and couplings. Thus, instead of a simple single assembly which is usable by picking the single assembly up and attaching tubing to it, the user must fumble with locating the adapter/coupling 2, locating one or more retaining rings 4, assembling the components to each other, and finally inserting tubing (not shown) over a barbed fitting 6 on the adapter and under interior barbs 8 on the retaining ring 4. The barbs 8 can then be slid over the tubing toward the exterior barbs 6 to help "lock" the tubing on the adapter/coupling 2.

In certain assemblies, it can be difficult to determine the position of the tubing on the adapter/coupling once the retaining ring has been "locked" into place. Thus, it may be difficult or impossible to determine whether the tubing is properly positioned, or if it has dangerously loosened over time, without removing the lock ring. This is especially important for those applications where the pressure from the fluid pumped through the tubing tends to push the tubing off the adapter.

In certain applications, such as irrigation systems, these assemblies are commonly used to connect tubing or hose to other components of the system. Among other things, such connected tubing or hose may have, at its other extremity, another coupling, a hose end, an ell, or some other fitting. Typically, the more quickly, easily, and reliably those system components can be connected to each other (via such a coupling or adapter), the more economic the installation becomes. Maintenance of the system can similarly benefit from better coupling apparatus and methods.

OBJECTS AND ADVANTAGES OF THE INVENTION

It is, therefore, an object of my invention to provide an improved apparatus for attaching tubing, characterized by an adapter member with an exterior barb to engage the tubing and a sleeve member operatively positioned around the adapter. The sleeve member preferably includes one or more view ports, which enable the user to visually confirm the tubing has been properly and completely assembled onto the adapter member. Following initial assembly, the view ports permit the user to visually ascertain the position of the tubing on the adapter.

Another object of my invention is the provision of an apparatus of the aforementioned character that preferably includes cooperating engagement detents on tee adapter and sleeve member, for initial engagement of the retaining sleeve with the adapter member prior to assembly with tubing. The sleeve or retaining member also preferably includes an interior barb to help prevent inadvertent dislodgment of the tubing from the adapter/coupling. The adapter can include one or more other ends in internal fluid communication with the first end, which other ends may be any of a wide variety of configurations. Representative examples of those other ends include ends similar or identical to the first end, a valve or other outlet, a plug, an elbow or tee, a container, a manifold, or another type of connection or fitting.

A further object of my invention is the provision of a method of use of an adapter/coupling of the aforementioned character, including various combinations of the steps of assembling the retaining member with the adapter member prior to assembly with selected tubing; engaging the adapter member and retaining member on the tubing; and utilizing the view ports to confirm that the tubing is properly assembled on the adapter member.

A still further object of my invention is the provision apparatus for attaching tubing, including an adapter having a first end with an exterior barb thereon engageable with tubing, in which the adapter includes one or more engagement detents spaced from the exterior barb. A cooperating sleeve member includes at least one engagement detent for initial retention of the retaining member on the adapter prior to assembly with the tubing.

Another object of my invention is the provision of apparatus of the aforementioned character, in which the sleeve member includes at least one interior barb configured and dimensioned to clear the exterior barb when no tubing is assembled thereon and to interferingly engage the tubing when the tubing is assembled with the adapter.

Yet another object of my invention is the provision of apparatus of the aforementioned character, in which the sleeve member includes one or more ports for viewing the tubing assembled on the adapter.

An additional object of my invention is the provision of apparatus for attaching tubing, including an adapter having a first end with an exterior barb thereon engageable with tubing, and a retaining member having at least one interior barb configured and dimensioned to clear the exterior barb when no tubing is assembled thereon and to interferingly engage the tubing when the tubing is assembled with the adapter, the retaining member further including one or more ports for viewing the tubing when it is assembled on the adapter.

Another object of my invention is the provision of apparatus of the aforementioned character, in which the adapter and the retaining member include cooperating engagement portions for initial engagement of the retaining member with the adapter member prior to assembly with the tubing.

Still another object of my invention is the provision of apparatus of the aforementioned character, in which the adapter includes one or more other ends with an exterior barb thereon and with an additional sleeve or retaining member assembled thereon.

A still further object of my invention is the provision of an irrigation tubing assembly, including a coupling member having first and second ends with exterior barbs thereon engageable with elastic tubing; and a retaining member for the at least one of the ends. The retaining member has at least one interior barb that can slide over the corresponding exterior barb on the coupling member when no tubing is assembled thereon, but which interferingly engages the tubing when the tubing is sufficiently assembled onto the coupling member. The retaining member further includes one or more apertures for viewing the tubing when the tubing is assembled on the coupling member.

Still another object of my invention is the provision of an assembly of the aforementioned character, further including an engagement lip on the coupling member remote from the exterior barb, and at least one corresponding tab on the retaining member engageable with the engagement lip. These cooperating engagement means permit the retaining sleeve or member to be preassembled with the coupling member, so that the assembly can be stored, transported, inventoried, and used as a single unit rather than as separate components, to attach tubing. The tubing usable with the invention is typically elastic, permitting it to deform over and under the respective barbs on the coupling member and the sleeve, and to thereafter "grip" or be otherwise engaged with the barbs to prevent subsequent separation of the tubing from the assembly.

Yet another object of my invention is the provision of a method of assembling tubing onto a fitting, including the steps of providing an attachment member having a first end with at least one exterior annular coupling barb and at least one exterior annular engagement lip, providing at least one locking collar temporarily engaged with the at least one engagement lip, the locking collar including an interior barb, providing at least one section of tubing having at least one end, and engaging the end of the tubing with the coupling barb and the locking collar barb.

Still another object of my invention is the provision of a method of the aforementioned character, including the steps of providing a view port in the locking collar, and visually confirming engagement of the tubing with the coupling. Further steps can include providing one or more additional ends of the attachment member in fluid communication with the first end, providing corresponding additional locking collars, and ring the remaining aforementioned steps for the additional ends and the additional locking collars.

Other objects and adages of the invention will be apparent from the following specification and the accompanying drawings, which are for the purpose of illustration only.

BRIEF DESCRIPTION OF THE DRAWINGS

FIG. 5 is a sectional view incorporating FIG. 4 with an elbow fitting on the remote end of the tubing 30;

FIG. 6 is a sectional view of the fitting on the lower-left portion of FIG. 5, rotated 90 degrees and without tubing engaged therewith, taken along line 6—6 of FIG. 7;

FIG. 7 is an end view of the fitting of FIG. 6, taken along line 7—7;

FIG. 8 is a sectional view of a hose end fitting, one of the many alternative fittings that can be assembled in place of the elbow fitting in FIG. 5;

FIG. 9 is a sectional view of another coupling fitting, another of the many alternative fittings that can be assembled in place of the elbow fitting in FIG. 5; and FIG. 10 illustrates the assembly of tubing with threaded fittings such as those illustrated in FIGS. 6–9.

DESCRIPTION OF PREFERRED EMBODIMENT

Figure 2:
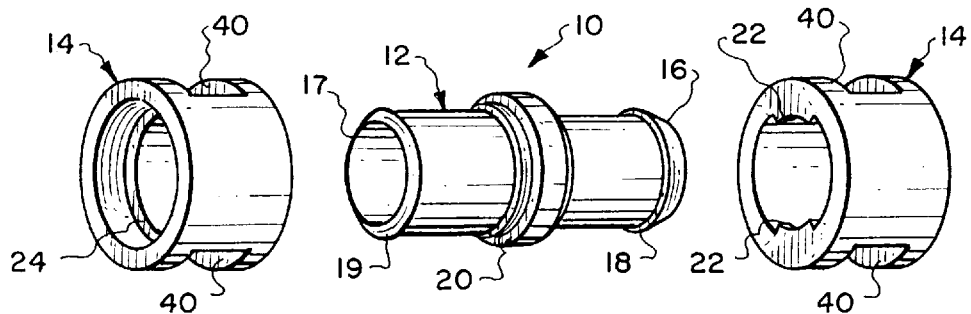
FIG. 2 is an isometric view of the components of a preferred embodiment of the invention manufactured in accordance with the teachings of the invention, prior to assembly together and then onto tubing (not shown)
Figure 3:
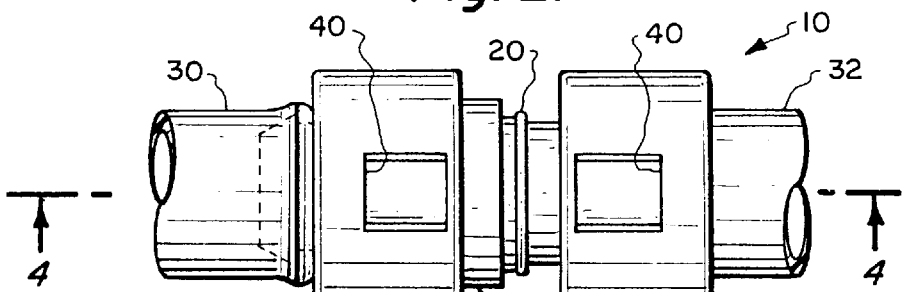
FIG. 3 is foreshortened side view of the coupling of FIG. 2, showing the components assembled together and engaged with tubing.
Figure 4:
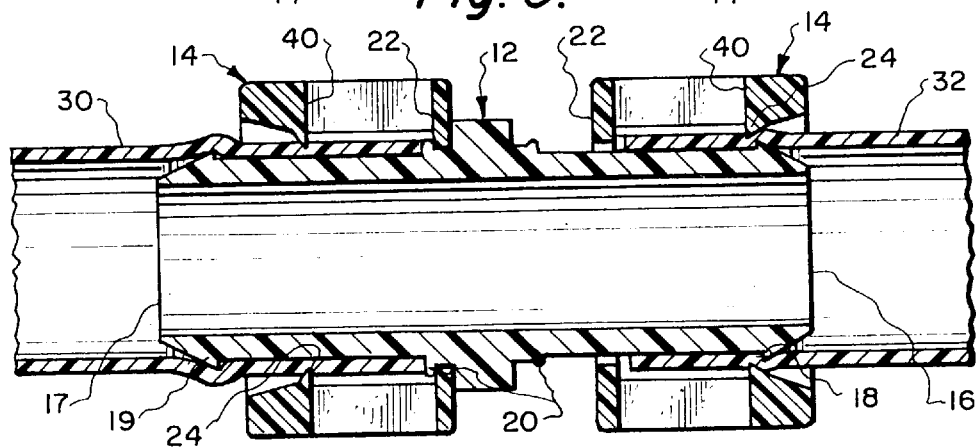
FIG. 4 is a sectional view taken along line 4—4 of FIG. 3.

Referring to the drawings, and particularly to FIGS. 2–4 thereof, I show an improved tubing coupling apparatus 10 constructed in accordance with the teachings of the invention. The components described herein can be made from any suitably strong material, and by any suitable method of fabrication. The components are preferably lightweight, and made of plastic or similar material by injection molding or a similar process.

Persons of ordinary skill in the art will understand that, although the drawings illustrate a coupling for joining two pieces of tubing, the invention may be utilized in a variety of applications which join tubing to other structures (rather than joining two pieces of tubing). By way of example and not by way of limitation, the invention can be practiced by providing one-half of the structure (right or left half) shown in FIGS. 2–4 attached to a valve or some other outlet, to a plug, to an elbow or tee, to a container, to a manifold, or to another type of connection or fitting. Moreover, multiple adapters of the "one-half" type just described can be provided on a single manifold or other pipe segment to provide fluid communication among a plurality of tubes or components.

Examples of some of the many other assemblies, components, and systems in which and with which the coupling may be readily utilized are shown in FIGS. 5–10, as discussed more thoroughly below.

The apparatus 10 preferably includes an adapter 12 and one or more sleeves or retaining members 14. As indicated above, descriptions herein of either end of the embodiment shown in FIGS. 2–4 are applicable to both ends.

The adapter 12 preferably has a first end 16 with an exterior barb 18 formed thereon. A similar barb 19 is preferably provided on the opposite end 17, as discussed herein. The barb 18 is configured to be engageable with tubing, such as is illustrated in FIGS. 3 and 4. The adapter 12 also preferably includes one or more engagement detents 20 spaced from the exterior barb.

The lock ring or sleeve member 14 preferably includes at least one engagement detent 22 for initial retention of the sleeve member on the adapter prior to assembly with the tubing. As indicated above, this permits the adapter or coupling unit to be stored, handed, transported and used as a "single unit". Among other things, this avoids the need to fumble for the prior art rings (such as ring 4 of FIG. 1), slide them onto the adapter first (before sliding the tubing on the adapter and into the ring), and then slide them back onto the adapter/tubing assembly to try to "lock" the tubing onto the adapter.

The engagement detent 22 is illustrated as including two flexible tab members which can elastically deform to permit the initial movement of the sleeve 14 over the exterior barb 18 and the engagement lip 20. The preferred position for that pre-tubing assembly is shown on the left side of FIGS. 3 and 4, although the tubing is also shown in those drawings. Persons of ordinary skill in the art will understand that, if the left-hand side tubing were removed from those FIGS. 3 and 4, the preferred assembly of the sleeve 14 on the coupling 12 would be shown.

That engagement of the tab member or members 22 with the cooperating detent or engagement ring or lip 20 is preferably sufficiently strong to keep those components assembled during transportation and handling of the device to the point of final assembly with the tubing. At that time or subsequently (and as more thoroughly described below), the tubing may move or be moved outwardly from the enter of the adapter 12, pulling the tab members 22 free from the engagement lip 20. This position is illustrated in the right-hand side of FIGS. 3 and 4.

In that regard, the sleeve member also preferably includes at least one interior barb 24. In the accompanying drawings, the barb 24 is shown as an annular interior ring, similar to the annular exterior ring 18 on the adapter 12. Persons of ordinary skill in the art will understand that at least certain functions of those barbs 18 and 24 may be accomplished by providing one or more barb components (an embodiment not shown in the drawings) cooperatingly spaced about the end 16 of the adapter and the inside of the lock ring 14, to provide the desired engagement with the tubing described herein.

Persons of ordinary skill in the art will also understand that, although the drawings illustrate the invention as having a circular cross-section, most or all of the benefits of the invention can be enjoyed in applications using other tubular cross-sections, such as square, oval, rectangular, etc. For cross-sections having corners (such as square, rectangular, or polygonal cross-sections), it is preferable to have rounded outer surfaces on those corners to reduce stress and wear on the tubing and thereby extend the life of the assembly.

As indicated above, the tab members 22 preferably pass over the exterior barb 18 by bending or "snapping" (without breaking), and similarly snap into the desired temporary engagement with the detent ring 20. To facilitate that "pre-tubing" process, the interior barbs 24 are preferably configured and dimensioned to clear the exterior barb 18. Although the two barbs 18 and 24 thus clear each other when no tubing is assembled with the apparatus, the interior barb 24 is preferably dimensioned and configured to bitingly engage the tubing as it is slid toward the center of the adapter 12, helping to prevent the reaction outwardly of the tubing from the adapter member 12.

Thus, focusing on the left-hand side of FIGS. 3 and 4 for purposes of illustration, the tubing 30 is preferably elastic and is dimensioned and fabricated so that it can be forced over the barb 19 and under the barb 24 until it abuts the engagement lip 20. For most applications, the fit between the tubing 30 and the coupling 12 will need to be sufficiently tight to prevent leakage of any liquid, gas or slurry flowing through the interior of the tubing and coupling. In addition to that desirable sealing, the tubing and adapter must be sized relative to each other so that the tubing can be forced into abutment with the engagement lip 20, as discussed above.

As also noted above, the interior barb 24 is preferably sized and configured to permit the aforementioned assembly of the tubing onto the adapter/coupling 12, but to also "bite" into the tubing if it is pulled in the opposite direction after insertion. As indicated above, this pulling in the opposite direction sometimes occurs under normal operating conditions of the irrigation system or other apparatus into which the invention might be incorporated. Among other things, the internal pressure of the fluid flow in the tubing sometimes tends to blow the tubing away from the adapter/coupling. If that occurs, the preferred embodiment of the invention is dimensioned and fabricated so that the "bite" between the interior barb 24 and the tubing 32 is stronger than the retaining force holding the tab members 22 behind the retaining lip 20. Thus, the entire assembly (the tubing 32 and the sleeve 14) slides outwardly until the barbs 18 and 24 bind the tubing even more forcefully, into the position illustrated on the right-hand side of FIGS. 3 and 4.

Persons of ordinary skill in the art will understand that the just-described sliding of the entire assembly (the tubing 32 and the sleeve 14) outwardly can also be done manually, by the person assembling the tubing to the apparatus, if that increased "locking" is desired.

To assist in the aforementioned assembly of the invention, the sleeve member 14 also preferably includes one or more ports 40 for viewing the tubing as it is being assembled on the adapter 12 and afterwards. The ports or apertures 40 can be of any convenient size and location, and preferably enable the person assembling the tubing onto the adapter 12 to visually verify that the tubing has been sufficiently pushed onto the adapter 12. Similarly, after assembly, and even as part of a regular inspection program, the ports can provide useful visual verification that the tubing remains satisfactorily engaged on the adapter 12 and that the tubing is in satisfactory condition.

Persons of ordinary skill in the art will understand that the aforementioned cooperating engagement between the retaining member or members 14 and the adapter member 12 prior to assembly with the tubing can be accomplished by a wide variety of means and structures, all of which are intended to be encompassed within the claims appended hereto. Similarly, the various barb members, and even the sleeve and coupling members may take a wide range of configurations while still enabling the practice of the invention. Among other things, and as mentioned above, the invention can be practiced as a single adapter (such as either the right or left half of the illustration of FIGS. 3 and 4), a plurality of such adapters in fluid communication with one another, or one or more such adapters mounted on a container, a manifold, an elbow, a tee, a valve, or some other component.

As illustrated in FIGS. 5–10, the coupling adapter 10 is useful in assemblies involving other fittings. For example, FIGS. 5–7 illustrate an elbow or ell-shaped conduit 50 as it might be assembled with the coupling adapter 10. The tubing 30 is shown illustrated FIG. 5 in a very short length. Persons of ordinary skill in the art will understand that it can be of any suitable length. The tubing 30 includes a first end 31 engaged with the coupling adapter 10 as discussed above, and a remote or second end 33 engaged with the elbow 50. Although the illustration of FIG. 5 represents a threaded engagement between the end 33 and the elbow 50, persons of ordinary skill in the art will understand that the engagement can be of any suitable type, including an adapter and sleeve structure similar to coupling 10, adhesive bonding, ultrasonic welding, or the like.

The elbow 50 is further illustrated in FIGS. 6 and 7 as including a first attachment portion 52 and a second attachment portion 54, and allowing fluid flow therebetween.

Persons of ordinary skill in the art will understand that tubing or hose can be assembled with the first attachment portion 52 by threading or twisting the tubing onto the outside of that portion. Similarly, they will understand that a similar assembly can be made with the second portion 54 by inserting the hose or tubing into the opening 55 and rotating the components with respect to each other. Such rotation is illustrated in FIG. 10, in which another piece of tubing or pipe 56 is rotated with respect to the elbow 50. A sectional view of the completed engagement of tubing 56 with the elbow 50 is shown on the left-hand portion of FIG. 5.

Many other fittings and structures can be utilized place of, or in addition to, the elbow 50. For example, irrigation systems commonly utilize not only ells such as elbow 50, they also incorporate end or hose caps such as cap 60, FIG. 8, or adapters such as adapter 70, FIG. 9.

The cap or hose end 60 is illustrated as similar to the second portion 54 of the elbow 50, FIG. 6, but plugs the fluid flow passing through the tubing. Although the tubing is not shown in FIG. 8, persons of ordinary skill in the art will understand that it is preferably similarly assembled with the cap 60, by inserting the hose or tubing into the opening 62 and rotating the components with respect to each other. In the embodiment of FIG. 8, the fluid flow is blocked or plugged by a plug portion 64, which provides a seal against fluid passing from (as illustrated in FIG. 8) right to left through the cap 60. Persons of ordinary sill in the art will understand that the plug portion 64 can take any of a wide range of configurations and positions within the cap 60, so long as it suitably blocks the fluid flow. For example, in alternative embodiments (not shown), it can be integrally formed adjacent the opposite end of the cap 60, such as at end 66 in FIG. 8.

The adapter 70, FIG. 9, is very similar to the elbow 50 of FIGS. 5–7 and 10, but does provides a straight connection rather than the 90 degree connection afforded by the elbow 50. As illustrated, the adapter 70 provides a first attachment portion 72 for tubing or hose (not shown) to be engaged onto the exterior of the adapter, and a second attachment portion 74 for tubing or hose (not shown) to be engaged with internal threads of the adapter.

The adapters and other fittings useful with the systems and assemblies of the invention can be fabricated from any suitable materials and by any suitable methods. Preferably, such fittings are formed of plastic or similar material by injection molding or similar process.

A related preferred method of assembling tubing onto a fitting and engaging that assembly with one or more other fittings includes the steps of (a) providing an attachment member having a first end with at least one exterior coupling barb and at least one exterior engagement lip, (b) providing at least one locking collar temporarily engaged with the at least one engagement lip, the locking collar including an interior barb, (c) providing at least one section of tubing having at least one end, and (d) engaging the end of the tubing with the coupling barb and the locking collar barb. The method can also include the steps of providing a view port in the locking collar, and visually confirming engagement of the tubing with the coupling. In certain applications, as described above, the preferred method includes the steps of providing one or more additional ends of the attachment member in fluid communication with the first end, providing corresponding additional locking collars, and repeating the remaining aforementioned steps for the additional ends and the additional locking collars. In assemblies and systems such as irrigation systems, the opposite end of the tubing members can be connected to any of a wide range of fittings, including by way of example and not by way of limitation, hose ends, elbows, tees, or the like.

Figure 1:
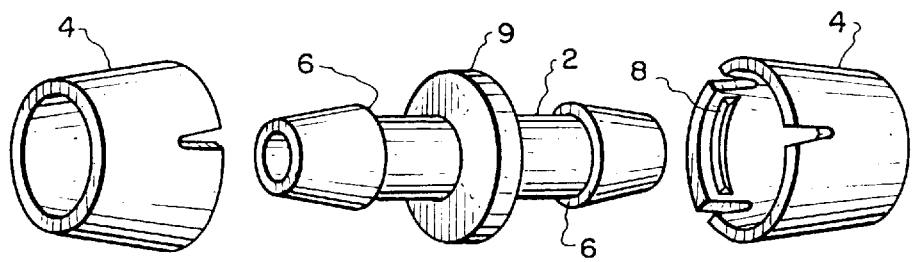
FIG. 1 is an isometric view of the components of a conventional prior art barbed fitting system, prior to assembly on tubing (not shown)

The preferred method thus improves the ease and efficiency of joining tubing to another device, in comparison to prior art systems such as illustrated in FIG. 1. A user no longer has to locate a separate sleeve member and place it onto the adapter before forcing the tubing over the barb on the adapter and into the sleeve member, and then forcing the sleeve member back over the adapter/tubing combination. Instead, the user simply forces the tubing onto the adapter/sleeve assembly. The user is thus able to assemble and maintain systems, such as irrigation systems involving multiple pieces of tubing and multiple fittings, in a quicker and more economical and reliable manner than with prior art devices and methods.

Thus, by my invention I provide an improved tubing coupling member assembly and combination of same with tubing and other fittings, which provides numerous advantages, including improved handling and ease of assembly, visual verification of such assembly, decreased number of separate components at the point of assembly with the tubing, and economy over coupling systems presently known in the art.

The improved apparatus and method of my invention have been described with some particularity, but the specific designs, constructions and steps disclosed are not to be taken as delimiting of the invention in that various obvious modifications will make themselves apparent to those of ordinary skill in the art, all of which will not depart from the essence of the invention and all such changes and modifications are intended to be encompassed within the appended claims.

I claim:

1. Apparatus for irrigation, including:
   tubing having a first end and a second end remote therefrom;
   an adapter having a first end with an exterior barb thereon engageable with said first end of said tubing, in which said adapter includes one or more engagement detents spaced from said exterior barb;
   a sleeve member around said adapter, said sleeve member including at least one detent engageable with said adapter engagement detent for initial retention of said sleeve member on said adapter prior to assembly with said tubing
   said sleeve member further including at least one interior barb spaced from said sleeve member detent, said at least one interior barb configured and dimensioned to clear said exterior barb when no tubing is assembled thereon and to automatically interferingly engage said tubing when said tubing is assembled under said interior barb by pushing said tubing in a first direction onto said adapter, said automatic interfering engagement being such that subsequent movement of said tubing in the direction opposite to said first direction correspondingly moves said sleeve member in that same subsequent direction and disengages said sleeve member detent from engagement with said adapter engagement detent; and
   a fitting engaged with said second end of said tubing.

2. The apparatus of claim 1, in which said sleeve member includes one or more ports for viewing the tubing assembled on the adapter.

3. The apparatus of claim 1, in which said fitting engaged with said second end of said tubing includes a hose end.

4. The apparatus of claim 1, in which said fitting engaged with said second end of said tubing includes an elbow.

5. The apparatus of claim 1, in which said fitting engaged with said second end of said tubing includes a second adapter and sleeve member combination of the type described herein.

6. An irrigation tubing assembly, including:

elastic tubing having a first end and a second end remote therefrom;

a coupling member having first and second ends with exterior barbs thereon engageable with said tubing, at least one of said ends having an engagement lip remote from its respective said exterior barb;

a retaining member slidably positioned about said at least one of said ends, said retaining member having at least one interior barb which can slide over the corresponding exterior barb on said coupling member when no tubing is assembled thereon and which automatically interferingly engages said tubing when said tubing is sufficiently assembled onto said coupling member, said retaining member including at least one interior tab for initial engagement with said engagement lip, said retaining member further including one or more apertures for viewing said tubing when assembled therewith, said interfering engagement causing sliding of said retaining member out of said initial engagement with said engagement lip when said tubing is moved axially toward said first end of said adapter; and a fitting engaged with said second end of said tubing.

7. The assembly of claim 6, in which said fitting engaged with said second end of said tubing includes a hose end.

8. The assembly of claim 6, in which said fitting engaged with said second end of said tubing includes a tubing ell.

9. The assembly of claim 6, in which said fitting engaged with said second end of said tubing includes a second coupling member and retaining member as claimed herein.

10. A method of assembling tubing onto a fitting, including the steps of:

(a) providing an attachment member having a first end and a second end in fluid communication with each other, each of said first and second ends having at least one exterior coupling barb and at least one exterior engagement lip, (b) providing at least one section of tubing having at least one end, (c) providing at least one locking collar initially engaged with said at least one engagement lip on said first end of said attachment member, said locking collar including an interior barb dimensioned to automatically engage said end of said tubing upon insertion of said end over said exterior coupling barb and under said interior barb, said interior barb being positioned on said locking collar so that said initial engagement of said collar with said engagement lip spaces said interior barb sufficiently from said exterior coupling barb to permit said insertion of said tubing end over said exterior barb and under said interior barb, and (d) engaging said end of said tubing with said coupling barb and said locking collar barb, whereby subsequent movement of said tubing in the opposite direction of said insertion correspondingly moves said at least one locking collar in that same direction.

11. The method of claim 10, including the steps of:

providing a view port in said locking collar, and visually confirming engagement of said tubing with said coupling.

12. The method of claim 10 or claim 11, including the steps of providing one or more additional ends of said attachment member in fluid communication with said first end, providing corresponding additional locking collars, and repeating the remaining steps of those claims for said additional ends and said additional locking collars.

13. The method of claim 10 or claim 11, in which said step of providing at least one section of tubing includes providing said tubing having a second end, and further including the step of connecting another fitting to said second end.

14. The method of claim 13, in which said step of connecting another fitting to said second end includes connecting a hose end to said second end.

15. A method of assembling irrigation tubing onto a fitting, including:

(a) providing an attachment member having a first end adapted for insertion into the tubing and having at least one exterior engagement lip for temporarily engaging corresponding engagement structure on a locking collar positioned around said attachment member, (b) further providing on said locking collar separate means to automatically engage said tubing after said tubing has been inserted over said first end of said attachment member and past said separate means; and (c) temporarily affixing said locking collar around said first end by engaging said corresponding engagement structure on said collar with said engagement lip on said attachment member; and (d) disengaging said corresponding engagement structure from said engagement lip on said attachment member by moving said tubing axially away from said engagement lip.

16. Apparatus for attaching tubing, including:

an adapter having a first end with an exterior barb thereon engageable with tubing, in which said adapter includes one or more engagement detents spaced from said exterior barb; and a sleeve member positioned about said adapter, said sleeve member including at least one corresponding engagement detent for initial retention of the sleeve member on said adapter prior to assembly with the tubing, said sleeve member being slidable axially toward said first end of said adapter, said sliding disengaging said sleeve member engagement detent from engagement with said adapter, said sleeve member including at least one interior barb configured and dimensioned to clear said exterior barb when no tubing is assembled thereon and to automatically interferingly engage the tubing when the tubing is assembled under said interior barb, said automatic interfering engagement being such that subsequent movement of said tubing in the opposite direction of the assembly direction correspondingly moves said sleeve member in that same direction.

17. The apparats of claim 16, in which said sleeve member includes one or more ports for viewing the tubing assembled on the adapter.

18. Apparatus for attaching tubing, including:

an adapter having a first end with an exterior barb thereon engageable with tubing; and a retaining member positioned around said adapter and having at least one interior barb configured and dimensioned to clear said exterior barb on said adapter when no tubing is assembled thereon and to automatically interferingly engage the tubing when the tubing is assembled with said adapter and is pulled back in a direction that would otherwise remove said tubing from said adapter;

said adapter and said retaining member including cooperating engagement portions for initial engagement of said retaining member on said adapter prior to assembly with the tubing;

said retaining member further including one or more ports for viewing the tubing when it is assembled on the adapter, said retaining member being slidable axially toward said first end of said adapter, said interfering engagement causing said sliding when said tubing is pulled back in the aforementioned direction that would otherwise remove said tubing from said adapter.

19. The apparatus of claim 16 or claim 18, in which said adapter includes one or more other ends with an exterior barb thereon and with an additional sleeve or retaining member assembled thereon.

20. An irrigation tubing assembly, including:

a coupling member having first and second ends with exterior barbs thereon engageable with elastic tubing, further including at least one engagement lip on said coupling member remote from said exterior barb on said at least one of said ends; and a retaining member for said at least one of said ends, said retaining member having at least one interior barb slidable over the corresponding exterior barb on said coupling member when no tubing is assembled thereon, said interior barb automatically interferingly engaging said tubing when said tubing is assembled thereunder with said coupling member, and including at least one corresponding tab on said retaining member engageable with said engagement lip, said retaining member being slidable axially toward said at least one of said ends, said interfering engagement causing said sliding of said retaining member as said tubing moves toward said at least one of said ends, whereby a sufficient distance of said sliding causes said corresponding tab to move out of engagement from said engagement lip.

21. The assembly of claim 20, said retaining member further including one or more apertures for viewing said tubing when assembled therewith.

22. An irrigation tubing assembly, including:

a retaining sleeve removably assembled with an adapter, in which said removable assembly is provided by at least one deformable tab on said retaining sleeve snapped over an engagement lip on said adapter; and elastic tubing engaged with said adapter, said tubing positioned on the exterior of said adapter and on the interior of said retaining sleeve, said retaining sleeve automatically engaging said tubing upon assembly of said tubing with said retaining sleeve and adapter, said automatic engagement causing sliding of said retaining sleeve with said tubing as said tubing moves toward said first end of said adapter; said sliding disengaging said deformable tab from said engagement lip.

23. The assembly of claim 22, said retaining sleeve including one or more ports for viewing said tubing.

24. Apparatus for attaching tubing, including coupling means and lock ring means temporarily retained on said coupling means; said coupling means having exterior annular engagement means, and said lock ring means having interior annular engagement means engageable with said exterior annular engagement means of said coupling means to provide said temporary retention prior to engagement with tubing means, said lock ring means further having automatic engagement means to engage the tubing once it is slid thereunder so tat sliding the tubing in the opposite direction drags said lock ring means in that same direction.

25. The apparatus of claim 24, said lock ring means further including viewing means configured to permit visual confirmation of engagement of said coupling means with tubing means.

26. The apparatus of claim 24 or claim 25, wherein said interior annular engagement means of said lock ring means is configured and dimensioned to removably snap fit over said exterior annular engagement means of said coupling means.

27. A method of assembling tubing onto a fitting, including the steps of:

(a) providing an attachment member having a first end with at least one exterior coupling barb and at least one exterior engagement lip, (b) providing at least one section of tubing having at least one end, (c) providing at least one locking collar temporarily engaged with said at least one engagement lip, said locking collar including an interior barb dimensioned to automatically engage said end of said tubing upon insertion of said end over said exterior coupling barb and under said interior barb, said interior barb being positioned on said locking collar so that said temporary engagement of said collar with said engagement lip spaces said interior barb sufficiently from said exterior coupling barb to permit said insertion of said tubing end over said exterior barb and under said interior barb, and (d) engaging said end of said tubing with said coupling barb and said locking collar barb, whereby subsequent movement of said tubing in the opposite direction of said insertion correspondingly moves said at least one locking collar in that same direction.

28. The method of claim 27, including the steps of:

providing a view port in said locking collar, and visually confirming engagement of said tubing with said coupling.

29. The method of claim 27 or claim 28, including the steps of providing one or more additional ends of said attachment member in fluid communication with said first end, providing corresponding additional locking collars, and repeating the remaining steps of those claims for said additional ends and said additional locking collars.

30. The apparatus of claim 16 or claim 17 or claim 24, including a fitting engaged with a remote end of the tubing.

31. The method of claim 27 or claim 28, including the steps of providing a second end of said tubing remote from said first end, and engaging a fitting with said second end of said tubing.

* * * * *